Nov. 13, 1928.

R. H. KIPP 1,691,549

DISK LISTER ATTACHMENT FOR CULTIVATORS

Filed Nov. 25, 1925    2 Sheets-Sheet 1

Inventor.
Roy H. Kipp,
By
Atty.

Nov. 13, 1928.  
R. H. KIPP  
1,691,549  
DISK LISTER ATTACHMENT FOR CULTIVATORS  
Filed Nov. 25, 1925  2 Sheets-Sheet 2
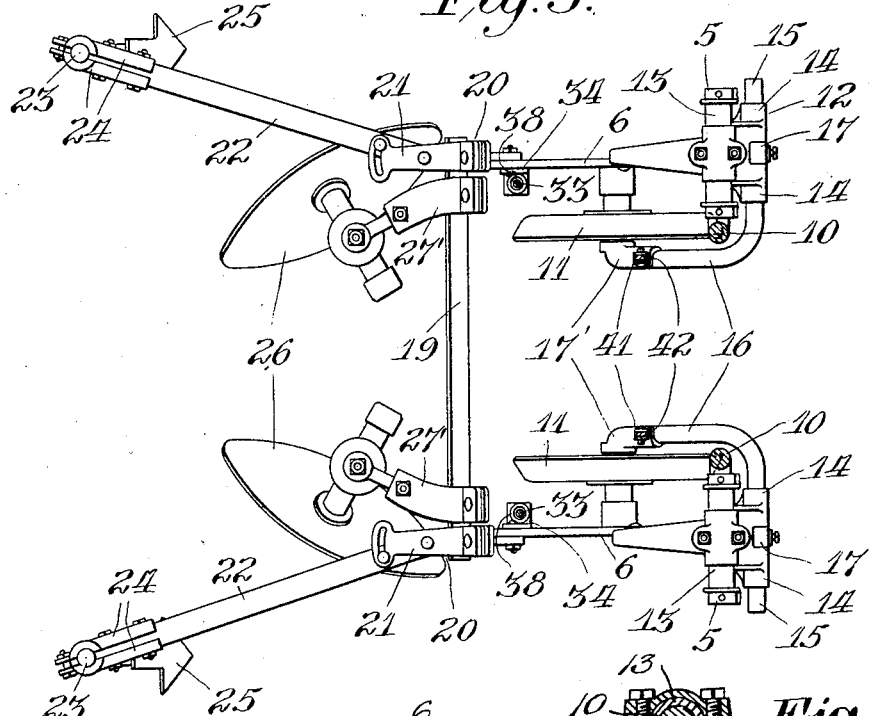
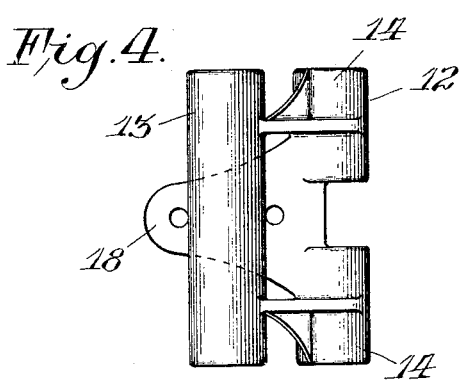
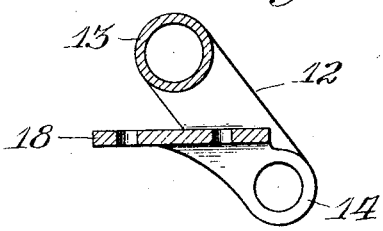
Inventor.  
Roy H. Kipp,  
By W. P. Daniels,  
Atty.

Patented Nov. 13, 1928.

1,691,549

UNITED STATES PATENT OFFICE.

ROY H. KIPP, OF CHICAGO, ILLINOIS, ASSIGNOR TO INTERNATIONAL HARVESTER COMPANY, A CORPORATION OF NEW JERSEY.

DISK-LISTER ATTACHMENT FOR CULTIVATORS.

Application filed November 25, 1925. Serial No. 71,325.

This invention relates to agricultural implements, and has for its object to provide certain improvements in cultivators.

One of such improvements has to do particularly with the manner of mounting the guide wheels of a lister cultivator so that they may be efficiently controlled concurrently with the beams of such a cultivator.

Among its other objects, the invention is intended to provide a lister cultivator with readily adaptable and adjustable guide wheels to effectively govern the course of adjacent cultivator beams as they operate upon the opposite sides of a furrow or ridge of earth in a lister-planted field.

In addition to these features above mentioned, by this invention there are provided certain other improvements which will be hereinafter particularly pointed out.

An illustrative embodiment of the invention is shown in the accompanying drawings, in which:

Fig. 3 is a plan view of one of the drag bar assemblies including two of the cultivator beams, the disks, the cultivator teeth and the guide wheels;

Fig. 4 is a plan of the bracket used to support the guide wheel drag bars from the ends of the cultivator arches;

Fig. 5 is a sectional view of one of the above mentioned brackets; and

Fig. 6 is a section through the coupling 12.

Figure 1:
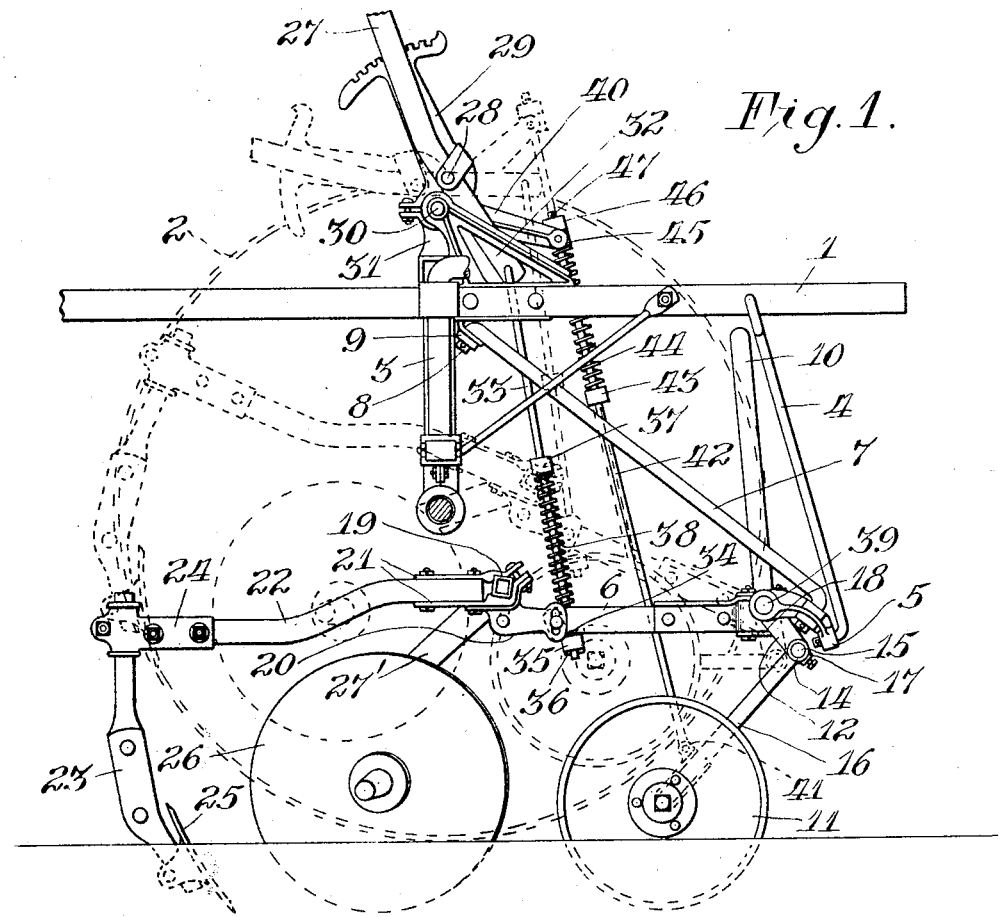
Fig. 1 is an elevational view of the cultivator, showing the relationships of the important parts of the invention, one of the supporting wheels being removed.
Figure 2:
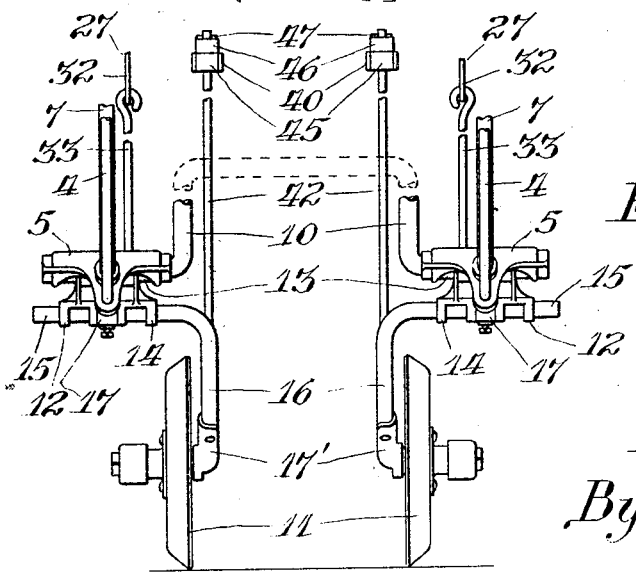
Fig. 2 is a partial front elevation showing the guide wheels and the manner in which they are attached to the cultivator.

In the cultivator illustrated, there is a wheeled frame represented at 1, one of the wheels for supporting that frame being indicated at 2. The frame includes a cranked axle element 3, operably associating the wheels and the frame parts. Such organizations are well known in the art, and it is, therefore, thought that more detailed disclosure or description of that part of the cultivator is unnecessary.

Pendulously supported by the forward part of the frame, links 4 are shown. These links act to assist in holding cultivator beams 6 in proper positions vertically of the implement. To accomplish this, the links are pivotally connected at their lower ends to brackets 5 which are in turn pivotally related to the beams 6.

To the above mentioned brackets are pivoted rearwardly and upwardly extending push bars 7, which transmit the draft from the cultivator frame to the beams. These bars have laterally bent upper ends 8 extending through brackets 9 rigid with the frame. The forward ends of the push bars may have limited lateral swinging motion relative to the brackets to permit appropriate and necessary lateral movements of the cultivator beams.

In order that such lateral movements of the cultivator beams may be appropriately restricted, and to afford means for holding two adjacent cultivator beams properly spaced, cultivator arches 10 are employed, having horizontally extending ends secured non-rotatively within the brackets 5. These ends of the arches pivotally support guide wheels 11 as well as the cultivator beams 6 through the agency of couplings 12 one of which is particularly illustrated in Figures 4 and 5 of the drawings.

Each coupling 12 has a sleeve portion 13 which is journaled upon the end of an arch 10. This sleeve portion is held in place laterally of the arch end by the terminals of the yoke-shaped part of the bracket 5 which is pinned to the arch. The lower portion of the coupling 12 is also formed as a sleeve 14 for pivotally receiving the laterally bent end 15 of a guide wheel drag bar 16. This drag bar is maintained in proper position relative to the coupling 12 by means of a collar 17 through which a set screw is threaded for forcible engagement with the drag bar 16. Each drag bar has secured to its lower end a journal bracket upon which a guide wheel is rotatively mounted.

The coupling 12 is shaped to form a flat beam securing portion 18 between the sleeve portions above described. To each coupling a cultivator beam 6 is bolted, the bolts passing through the portion 18. This arrangement of elements causes the coupling 12 to move pivotally on the end of an arch, as a consequence of the up and down movements of the cultivator beam.

At the rear ends of each pair of the cultivator beams 6, a rock shaft 19 is adjustably secured by means of two-piece brackets 20 which have rearwardly extending portions 21 for adjustably supporting shovel beams 22. These, in turn, maintain shovel standards 23 in rigid relation to the cultivator beams by means of other two-piece brackets 24. Shovels 25 are fastened to the lower ends of standards 23. These standards are spaced apart somewhat more widely than the guide wheels 11 and also more widely than the angularly set ridge working disks 26 which are rigidly and adjustably secured to the rock shaft 19 by two-part brackets 27' spaced inwardly of the brackets 20. This spacing of the standards 23 may be varied to meet different conditions.

From the above description, taken in connection with the disclosure in the drawings, it will be appreciated that the guide disks 11 are mounted so as to operate upon the ground in a position which is intermediate the points of pivotal mounting of the cultivator beams 6 and the working positions of the disks 26. By reason of the fact that the disks 11 are mounted upon drag bars 16 which, in turn, are mounted upon the bracket 12 so as to be freely oscillatable with respect thereto, the disks 11 have a floating action as the implement proceeds. This floating action is independent of the floating action of the beams 6 and the earth working elements 25 and 26 carried by those beams.

Furthermore, by reason of the fact that the drag bars 16 are much shorter than the cultivator beams 6, an arrangement of elements is provided whereby elevating and depressing mechanisms may be conveniently applied so as to render the disks 11 movable through a greater angle than the cultivator disks 26 by a common pivotal control device movable through a certain radial angle.

Such a control device as that above mentioned is afforded by this invention, and will now be described.

A lever 27 is pivotally mounted at 28 upon a rack bracket 29, which, in turn, is fixed to a rock shaft 30, rotatably mounted in a bracket 31, which is rigidly secured to the cultivator frame. Additional rack and lever mechanism (not shown) operates to hold the rock shaft 30 in any desired position of adjustment.

The lever 27 is extended past its fulcrum at 28, and has its lower portion 32 pivotally connected to a rod 33, there being one of the rods 33 for each cultivator beam 6. Each cultivator beam is provided with a bracket 34, perforated to allow the lower end of the rod 33 to pass therethrough. Below the bracket 34, a collar 35 is mounted upon the rod 33 and held against vertical downward displacement by means of a pin 36, passing through the rod 33. Interposed between the bracket 34 and a stop collar 37, mounted intermediate the ends of the rod 33, is a compression spring 38 operating to yieldingly resist upward movements of the cultivator beam. It will be evident from the above described structure that, when the lever 27 is released from the rack 29 by means of a detent (not shown), the lever 27 is free to be moved so as to elevate or depress a cultivator beam 6 by a pivotal motion about its axis 39.

When the lever 27 is moved without releasing its detent, which connects it with the rack 29, an arm 40, rigidly secured to the rock shaft 30, is moved to a corresponding extent so as to elevate or depress a guide wheel 11, as desired. The arm 40 is pivotally connected with a guide wheel drag bar 16 at a point forwardly of the axis of the attached guide wheel 11, the point of such pivotal connection being indicated at 41. The bracket 17' has the extension 41 to provide for this pivotal connection. The connecting devices between the arm 40 and the bracket 41 include a rod 42, a stop collar 43, a compression spring 44, a trunnioned collar 45, and a second stop collar 46, the latter being held in position upon the upper end of the rod 42 by means of a pin 47.

By reason of the fact that the disks 11 operate in positions which are but slightly vertically removed rearwardly from the forward ends of the cultivator beams 6, these disks 11 would not be elevated sufficiently to clear obstructions and facilitate turning of the cultivator, if those disks were secured directly to the cultivator beams so as to be elevated and depressed thereby. The elevating and depressing mechanism shown operates upon the guide wheels 11 and the disks 26 differentially. That is, the single lever 27 elevates a guide wheel 11 to a greater extent than the corresponding disk 26. By the expression "greater extent", the greater angular movement of the drag bar 16 is meant.

I claim:

1. A lister cultivator comprising a wheel supported frame, a pair of cultivator beams pivotally supported at their forward ends on the frame, earth working elements carried by the beams so as to operate near the rear ends of the beams, a pair of furrow guide wheels mounted on drag bars pivoted at positions spaced from the positions at which the beams are pivotally mounted, and a single lever having separate connections to a beam and a guide wheel actuable to elevate a beam and a guide wheel differentially, the guide wheel having an angular movement about its pivot greater than the angular movement of the beam moved by the same lever.

2. A lister cultivator having horizontally pivoted beams carrying disks, each of said beams having a guide wheel associated therewith at its forward end, the guide wheels being adjustable laterally with respect to the forward ends of the beams to accommodate furrows or hills of different width, said lateral adjustment being provided by brackets connecting with supports for the forward ends of the cultivator beams and drag bars which extend rearwardly to the guide wheels, and elevating and depressing mechanism separately connected to said cultivator beams and to said guide wheels whereby the operation of a single lever produces differential elevation or depression of a cultivator beam and its cooperating guide wheel.

3. A lister cultivator having a cultivator arch the ends of which pivotally support the forward ends of cultivator beams and the forward ends of drag bars which mount guide wheels for vertical movement independently of the cultivator beams, said drag bars having laterally extending ends held in parallel relation to said arch ends by brackets which have sleeve portions rotatively receiving said arch ends and said drag bar ends.

4. A lister cultivator having drag bar units pivotally mounted at their forward ends, one of said units including a cultivator disk and a cultivator shovel rigidly mounted thereon, the other unit having a guide wheel rotatively mounted on its rear extremity, the latter unit being much shorter than the former, and a common elevating and depressing control for said drag bar units operating to impart differential angular movements to said drag bar units by a certain angular movement of a single lever.

5. A tillage implement of the class described comprising, in combination, a wheel supported frame, arch constructions carried by the frame near its forward portion, and floating lister cultivator beam structures secured to the arch constructions; each floating lister cultivator beam structure including cultivator beams pivotally related to the arch constructions, a transverse member secured to the cultivator beams, tillage disks and shovels adjustably secured on the transverse member, and means for rockably adjustably securing the transverse member to the cultivator beams.

6. A tillage implement comprising, in combination, a wheel supported frame, a beam supporting arch carried by the frame, a floating lister cultivator beam structure pivotally secured at its forward end to the ends of the arch; said floating lister cultivator beam structure including cultivator beams directly pivoted upon the ends of the arch, a transverse member rigidly secured to the cultivator beams rearwardly of the arch, rotary tillage disks adjustably secured to the transverse member, cultivator shovels adjustably secured to the transverse member, means for adjusting the transverse member with respect to the cultivator beams, guide wheels, and guide wheel axles detachably secured to the forward ends of the cultivator beams.

7. A tillage implement comprising, in combination, a wheel supported frame, a beam supporting arch carried by the frame, and a beam structure pivoted upon the ends of the arch; said beam structure comprising a transverse member and cultivator beams rigidly secured together to form a U-shaped structure, rotary tillage disks adjustably supported on the transverse member near its ends, guide wheels positioned forwardly of the transverse member, inwardly extending guide wheel axles, couplings forming journals for the guide wheel axles, beam securing portions forming parts of the couplings and adapted to be detachably secured to the cultivator beams, and means for releasably locking the guide wheel axles in the journal portions of the couplings.

In testimony whereof I affix my signature.

ROY H. KIPP.